United States Patent
Jeseritz et al.

(10) Patent No.: US 11,428,056 B1
(45) Date of Patent: Aug. 30, 2022

(54) PIPE PULLER FOR DRILLING AND SERVICE RIG PIPE HANDLERS

(71) Applicant: Forum US, Inc., Houston, TX (US)

(72) Inventors: Michael R. Jeseritz, Litchfield, MN (US); Tyler J. Ellingson, Kimball, MN (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 17/199,434

(22) Filed: Mar. 11, 2021

Related U.S. Application Data (60) Provisional application No. 62/988,392, filed on Mar. 11, 2020.

(51) Int. Cl.
*E21B 19/15* (2006.01)
*F16L 1/028* (2006.01)

(52) U.S. Cl.
CPC ............ *E21B 19/155* (2013.01); *F16L 1/028* (2013.01)

(58) Field of Classification Search
CPC ......... E21B 19/14; E21B 19/155; F16L 1/028
USPC ....................................................... 105/29.1
See application file for complete search history.

(56) References Cited

U.S. PATENT DOCUMENTS

| | | | |
|---|---|---|---|
| 2,535,546 A | 12/1950 | Pitts | |
| 3,268,095 A * | 8/1966 | Durbin | E21B 19/155 414/22.59 |
| 3,404,741 A | 10/1968 | Gheorghe et al. | |
| 3,494,484 A | 2/1970 | McFadden | |
| 3,651,959 A | 3/1972 | Castela et al. | |
| 3,655,071 A | 4/1972 | Langowski et al. | |
| 3,916,500 A | 11/1975 | Brown | |
| 4,315,709 A | 2/1982 | Gulick | |
| 5,127,790 A | 7/1992 | Teague | |
| 5,695,044 A * | 12/1997 | Morikiyo | B61B 10/04 198/746 |
| 7,832,974 B2 * | 11/2010 | Fikowski | E21B 19/155 414/22.54 |
| 8,033,779 B2 * | 10/2011 | Gerber | E21B 19/15 414/745.9 |
| 8,215,887 B2 | 7/2012 | Fikowski et al. | |
| 8,215,888 B2 | 7/2012 | Tetley et al. | |

(Continued)

FOREIGN PATENT DOCUMENTS

| | | |
|---|---|---|
| CA | 2508998 A1 | 12/2006 |
| WO | WO 2006128300 A1 | 12/2006 |
| WO | WO 2016097838 A1 | 6/2016 |

*Primary Examiner* — Gregory W Adams
(74) *Attorney, Agent, or Firm* — Patterson & Sheridan, L.L.P.

(57) ABSTRACT

A pipe puller removably couples to a pipe handler skate using two manually removable pins. The pipe puller includes at least one slide and linear bearing combination, a skate plate affixed adjacent a first end of the slide and interposed between a front skate face and a pipe in the skidway, a pipe grasp pivotal between a first position disengaged from the pipe and a second position engaged with the pipe, linkage coupling the skate plate to pipe grasp and converting reciprocal movement of the skate plate into rotary movement of the pipe grasp, and a puller stop bracket secured to the pipe handler. A pair of force threshold activated pipe grasp assists retain the pipe grasp in either pipe-engaged or pipe-disengaged position until a force threshold is reached greater than and separate from the static and dynamic coefficients of friction of the various pintles and linear bearings.

18 Claims, 7 Drawing Sheets

(56) References Cited

U.S. PATENT DOCUMENTS

| | | |
|---|---|---|
| 8,454,296 B2 | 6/2013 | Gerber et al. |
| 8,696,289 B2 | 4/2014 | Tetley et al. |
| 8,840,352 B2 | 9/2014 | Taggart et al. |
| 9,476,265 B2 | 10/2016 | Tetley et al. |
| 10,030,455 B2 * | 7/2018 | Meuth .................. E21B 19/15 |
| 10,557,320 B2 * | 2/2020 | Arbelaez ............... E21B 19/15 |
| 2003/0159854 A1 | 8/2003 | Simpson et al. |
| 2007/0221385 A1 | 9/2007 | Braun et al. |
| 2009/0127001 A1 | 5/2009 | Felt |
| 2012/0121364 A1 | 5/2012 | Taggart et al. |
| 2014/0205417 A1 * | 7/2014 | Tetley ................. B41F 15/0872 414/746.8 |
| 2019/0316426 A1 * | 10/2019 | Meuth .................. F15B 15/02 |

* cited by examiner

PIPE PULLER FOR DRILLING AND SERVICE RIG PIPE HANDLERS

CROSS REFERENCE TO RELATED APPLICATIONS

The present application claims the benefit of U.S. provisional patent application 62/988,392 filed Mar. 11, 2020 of like title and inventorship, the teachings and entire contents which are incorporated herein by reference.

BACKGROUND OF THE INVENTION

1. Field of the Invention

This invention pertains generally to material or article handling, and more particularly to a pipe handler such as might commonly be used in the oil drilling and rigging industry to assist with the handling of very large and heavy pipes that are regularly raised to and lowered from an elevated drilling or servicing platform. A preferred embodiment provides a pipe puller to assist in safe and timely movement of pipe from the drilling rig deck or service rig floor to ground level, while the pipe handler is operating at lower elevations.

2. Description of the Related Art

In the oil drilling and rigging industry, though applicable in other industries as well, drilling platforms commonly referred to as derricks are assembled above the earth. These derricks facilitate the drilling, installation, and servicing of wells. The platform or work floor typically may be elevated many feet above the ground.

Drill strings of very large and heavy pipes are assembled or disassembled on the derrick. For exemplary and non-limiting purposes, these pipes may be stored horizontally on or near the ground adjacent to the derrick. This means that these very large and heavy pipes must be re-oriented from horizontal to more nearly vertical orientation, and raised from near ground level to several tens of feet into the air. Consequently, the handling of these large and heavy pipes is not suited to manual labor, and instead requires mechanical assistance.

Pipe handlers are commonly used to assist with the handling of these very large and heavy pipes that are regularly raised to and lowered from an elevated drilling platform. Traditionally when drilling into the earth or servicing a well, these segments of pipe are taken from a horizontal rack, moved to a platform, and then hoisted up into position to be driven into the earth. When completed the same pipe handling machinery is used to extract segments of pipe and return them to the rack. Due to the weight of the pipe segments, the force of gravity is normally sufficient to return the pipes down the pipe handler.

A large number of patents are exemplary of this technology, and provide the background for the basic features, while also contrasting with the novel features of the present invention. These U.S. patents, the contents and teachings which are incorporated herein by reference, include: U.S. Pat. No. 2,643,006 by King, entitled "Automatic pipe handler"; U.S. Pat. No. 2,880,881 by Robishaw, entitled "Unitized pipe rack"; U.S. Pat. No. 2,958,430 by Robishaw, entitled "Pipe rack and lay-down trough"; U.S. Pat. No. 3,559,821 by James, entitled "Drill Pipe Handling Apparatus"; U.S. Pat. No. 3,792,783 entitled "Pipe Handling System" and U.S. Pat. No. 3,916,500 entitled "Pipe handling apparatus", each by Cicero C. Brown; U.S. Pat. No. 4,386,883 by Hogan et al, entitled "Materials lifting apparatus"; U.S. Pat. No. 4,235,566 by Beeman et al, entitled "Pipe-conveying catwalk"; U.S. Pat. No. 4,140,227 by Beck, entitled "Cable way apparatus for transporting pipe"; U.S. Pat. No. 4,403,898 by Thompson, entitled "Pipe pick-up and laydown machine"; U.S. Pat. No. 4,439,091 by Frias, entitled "Pipe feeding system"; U.S. Pat. No. 4,494,899 by Hoang et al, entitled "Pipe trough for transporting pipe between upper and lower positions"; U.S. Pat. No. 4,684,314 by Luth, entitled "Pipe handling apparatus"; U.S. Pat. No. 6,079,925 by Morgan et al, entitled "Method and apparatus for lifting oilfield goods to a derrick floor"; U.S. Pat. No. 6,899,510 by Morelli et al, entitled "Pipe handling system for presenting sections of pipe to a derrick work floor having a pipe ejection assembly"; U.S. Pat. No. 7,021,880 by Morelli et al, entitled "Pipe handling apparatus for presenting sections of pipe to a derrick work floor having a high-speed carriage assembly"; U.S. Pat. No. 7,163,367 by Handley, entitled "Multi-position height adjustment system for a pipe handling apparatus"; U.S. Pat. No. 7,635,249 by Guidroz, entitled "Pipe pick-up and laydown apparatus"; U.S. Pat. No. 7,665,944 by Guidroz, entitled "Pipe pick-up and laydown apparatus and method"; U.S. Pat. No. 7,992,646 by Wright et al, entitled "Horizontal offline stand building system"; U.S. Pat. No. 8,052,368 by Littlewood et al, entitled "Catwalk for a drilling rig"; and 2008/0263990 by Morelli et al, entitled "Skidding system for a catwalk".

In addition to the aforementioned patents and published patent applications, the present applicant also commonly owns U.S. Pat. Nos. 9,388,647; 9,845,646; 10,626,687; and 10,920,504; the teachings and contents which are incorporated herein by reference. These patents illustrate novel height adjustment assemblies to set the maximum height that the skidway or trough, also sometimes referred to as the boom, will reach when the hydraulic lift cylinder is fully extended, a novel wedge that couples onto the end of a skidway to extend and redirect a skidway; and a novel pipe grabber that captures a pipe within the pipe supporting trough.

From these foregoing patents, the basic structure of a pipe handler and the function thereof will be well understood. In addition to the foregoing patents, Webster's New Universal Unabridged Dictionary, Second Edition copyright 1983, is incorporated herein by reference in entirety for the definitions of words and terms used herein.

Depending upon the geography, hardware such as blow-out preventers and wellheads, and other features of installation of a drilling or servicing derrick, the drilling or service platform will be at heights above surrounding land-vehicle accessible terrain that are not consistent. It is this variability that has, in part, driven the development of the aforementioned pipe handlers incorporated by reference herein above. One of the benefits of a trough-type pipe handler is the improved safety that is incorporated directly into the design. Friction between the pipe and the skidway, and the inherent trough-shaped geometry of the skidway will help to control the pipe, making these types of pipe handlers much safer than many of the alternatives. Unfortunately, these same benefits can at times interfere with optimal handling of the pipes.

The skidway skate, which is also variously referred to as a pipe stop member, carrier, or trolley, supports the pipe in the skidway from the lower end of the pipe, to prevent the pipe from sliding uncontrolled down the skidway and, when so driven, to push the pipe up the skidway. When the drilling platform is relatively lower to the ground, the slope of the boom and skidway down to the ground decreases. This decrease in slope means there is also less force applied from the pipe into the skidway skate. Consequently, at some critical angle, which is some function of weight of the pipe, friction between the pipe and the trough, and the like, the pipe will no longer slide downward along the skidway solely under the force of gravity. In such case, it is desirable that the skate be able to assist with the pulling of the pipe down the trough. In pipe handlers employing a skidway and skate, or equivalent thereof, to raise a pipe along the skidway and up to a drilling platform there is provided some type of drive that pushes the skate and a pipe propelled by the skate up the skidway. Nearly all of those pipe handlers also are provided with a powered mechanism to return the skate back down the skidway as well. This same drive then, at least in many prior art pipe handlers, could be used to assist with the pulling of the pipe down the skidway when the slope of the skidway is too low for gravity alone to do so. However, most of these same prior art pipe handlers are not so equipped.

A few artisans have recognized this limitation of prior art pipe handlers, and the opportunity created by the skate drive system to overcome the limitation. Exemplary U.S. patents, the teachings which are incorporated herein by reference, include: U.S. Pat. No. 7,832,974 by Fikowski et al, entitled "Pipe-handling apparatus"; U.S. Pat. No. 8,033,779 by Gerber et al, entitled "Pipe handling apparatus and methods"; U.S. Pat. No. 8,215,887 by Fikowski et al, entitled "Pipe-handling apparatus and methods"; U.S. Pat. No. 8,215,888 by Tetley et al, entitled "Cartridge tubular handling system"; U.S. Pat. No. 8,454,296 by Gerber et al, entitled "Pipe-handling apparatus and methods"; U.S. Pat. No. 8,696,289 by Tetley et al, entitled "Cartridge tubular handling system"; U.S. Pat. No. 8,840,352 by Taggart et al, entitled "Apparatus and method for handling pipe"; and U.S. Pat. No. 9,476,265 by Tetley et al, entitled "Trolley apparatus".

These patents provide a number of truly innovative approaches to selectively coupling an arm from the skate assembly to the pipe. During the downward travel of the pipe the arm engages with and pulls the pipe to assist with downward travel. In so doing, the skate, skate drive, and arm overcome any friction between the pipe and skidway that is not already overcome by gravitational forces.

While the pipe puller assemblies illustrated and described within these patents provide substantial benefit for lower-elevation drilling platforms, most are a fixed and integral part of the skate assembly. That means that they are present on the pipe handler whether required or not. Further, it also means that retrofitting existing pipe handlers is prohibitively difficult and expensive. As may be apparent, in spite of the enormous advancements and substantial research and development that has been conducted, there still remains a need for a reliable and more universal pipe puller assembly that can be easily installed and removed from nearly any pipe handler.

SUMMARY OF THE INVENTION

In a first manifestation, the invention is, in combination, a pipe handler, a pipe, and a pipe puller. The pipe handler comprises a skidway having a skidway first end and a distal skidway second end and thereby defines a skidway longitudinal axis. The pipe is supported within the skidway and is configured to be dispensed therefrom out of the skidway second end into a drilling and servicing rig. A skate reciprocates longitudinally relative to the skidway and has a front skate face configured to engage and push the pipe along the skidway longitudinal axis in the skidway. The pipe puller comprises a skate attachment having at least a framework coupled to the skate; at least one linear bearing supported by the skate attachment; at least one slide having a first end and a distal second end thereby defining a slide longitudinal axis that is parallel to the skidway longitudinal axis, the at least one slide passing through the at least one linear bearing and configured to linearly reciprocate within the at least one linear bearing; a skate plate interposed between the front skate face and the pipe and rigidly affixed to the at least one slide adjacent the at least one slide first end; a puller stop bracket secured to the pipe handler more distally from the at least one slide first end than from the at least one slide second end, the puller stop bracket configured to limit movement of the at least one linear bearing in a direction toward the skidway first end; a pipe grasp pivotal about a pipe grasp rotary axis that extends transverse to the longitudinal axis, the pipe grasp configured to pivot between a first pipe grasp position disengaged from the pipe and a second pipe grasp position engaged with the pipe; and a linkage coupling the skate plate to the pipe grasp and converting reciprocal movement of the skate plate into rotary movement of the pipe grasp about the pipe grasp rotary axis. The skate is configured to reciprocate in a first skate direction along the skidway longitudinal axis from the skidway second end toward the skidway first end sufficiently to first move the at least one linear bearing to the travel limit in the direction toward the skidway first end and subsequently continue to travel in the first skate direction to move the skate attachment relative to the at least one linear bearing and thereby pivot the pipe grasp to the first pipe grasp position disengaged from the pipe. The skate is also configured to reciprocate in a second skate direction along the skidway longitudinal axis from the skidway first end toward the skidway second end sufficiently to first move the at least one skate plate into contact with the pipe and subsequently continue to travel in the second skate direction to move the skate attachment relative to the skate plate and thereby pivot the pipe grasp to the second pipe grasp position engaged with the pipe.

OBJECTS OF THE INVENTION

Exemplary embodiments of the present invention solve inadequacies of the prior art by providing a pipe puller readily attached to drilling and service rig pipe handlers that allows a prior art pipe handler to bring pipe back to the kickers even at low slope. The present invention grabs the pipe and pulls the pipe down a skidway trough or the like using mechanical, automatic, and intuitive apparatus. When embodied as an attachment to an existing skate, the present invention is easily added to and makes existing pipe handlers more versatile, and reduces the need for duplicate expensive machinery. Adjustable pipe grips allow the pipe puller to be used on various pipe sizes. Actuation of the pipe puller can be magnetically assisted to better and more reliably engage with and disengage from the pipe.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a pipe puller that is adjustable for different pipe geometries and that facilitates safe movement of pipe down a skidway or the like, even at a low slope. A second object of the invention is to automatically mechanically engage and disengage the pipe puller by pressure to the front and rear of the skate, respectively, without the need for power, wires, sensors, or control systems to do so. Another object of the present invention is to provide a pipe puller that is reliable, intuitive, easily tested with obvious visual confirmation, and that will only require simple and infrequent service. A further object of the invention is to provide a pipe puller that attaches to existing skates within existing pipe pullers, and which may be quickly attached and detached from the existing skate such as with only two pins. Yet another object of the present invention is to stabilize the position of the pipe puller in either of the engage or disengage positions using either or both of magnetic or latch assistance.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

When operating on drilling or servicing platforms which are close to the ground, or at ground level, pipes will extend more nearly horizontally on the pipe handler. As a result, the gravitational force urging the pipe to slide down the pipe handler is overwhelmed by friction between the pipe and the skidway. As a result, in some of these low platform situations there may not be sufficient force to consistently bring pipe segments to the bottom of the pipe handler to be racked.

Manifested in the preferred embodiment, the present invention provides a pipe puller readily attached to drilling and service rig pipe handlers that allows a prior art pipe handler to bring pipe back to the kickers even at low angles. Preferred and alternative embodiments designed in accord with the teachings of the present invention grab the pipe and pull the pipe down the trough responsive to initial engagement with the pipe and the forces resultant therefrom. When embodied as an attachment, the present invention is easily added to and makes existing pipe handlers more versatile, and reduces the need for duplicate expensive machinery.

In a preferred embodiment of the invention illustrated in FIGS. 1-4, a pipe puller 10 has three major components. The first is skate attachment 20, the second is pipe grasp 40, and the third is puller stop bracket 60. These components are configured for installation onto a prior art pipe handler 1 in the general vicinity of the skate 3 when skate 3 is at the most rearward travel or reciprocation location.

Skate attachment 20 has a framework 21 that provides strength and support for other components, while also spanning skate 3. A plurality of openings 23 are illustrated that pass through the bottom straps of framework 21. These openings 23 are provided solely to pass around the heads of fasteners protruding from the top surface of skate 3 in a non-interfering and, in the case of the preferred embodiment, also in a non-engaging manner. As may be appreciated then, other geometries and constructions which may visually appear very different from the present illustrations will be provided in alternative embodiments, provided such geometries and constructions meet the structural requirements of the embodiment.

Securely affixed to framework 21 is a front support 22. In preferred embodiment pipe puller 10, front support 22 comprises a generally square tube having a front support pin hole 32 intermediate along the tube. Front support pin hole 32 is used for exemplary and non-limiting purpose in combination with an existing skate hood pin 28 and skate hood support 5 (visible in FIGS. 8 and 9) to couple skate attachment 20 on a front side to skate 3. Adjacent the upper end, front support 22 couples with pipe grasp 40 through puller arm pintle 47. Extending generally perpendicular to front support 22 are at least one, and preferably a plurality of slides 24. These slides pass through bushings 25, which are linear bearings that provide support and lubrication, thereby allowing slides 24 to reciprocate about their longitudinal axis.

Secured adjacent the front termination of slides 24 is a skate plate 26, which preferably has a geometry and function similar to that of the front face 7 of skate 3 so as to operatively engage with and push pipe 2 within a skidway or the like in pipe handler 1, as will be further understood below from the description of FIGS. 7 and 8. Adjacent the rear termination of slides 24 and coupled therewith is a rear slide stop plate 30. Most preferably, though optionally, protruding rearward therefrom is a rear push rod bumper 29. Supported on framework 21 and also generally adjacent the rear termination of slides 24 is a spring latch pin 27 of known construction. Spring latch pin 27 is used, for exemplary and non-limiting purpose, in combination with skate stop 4 on the rear face of skate 3 to couple therewith by passing through a thickness of skate stop 4.

Figure 1:
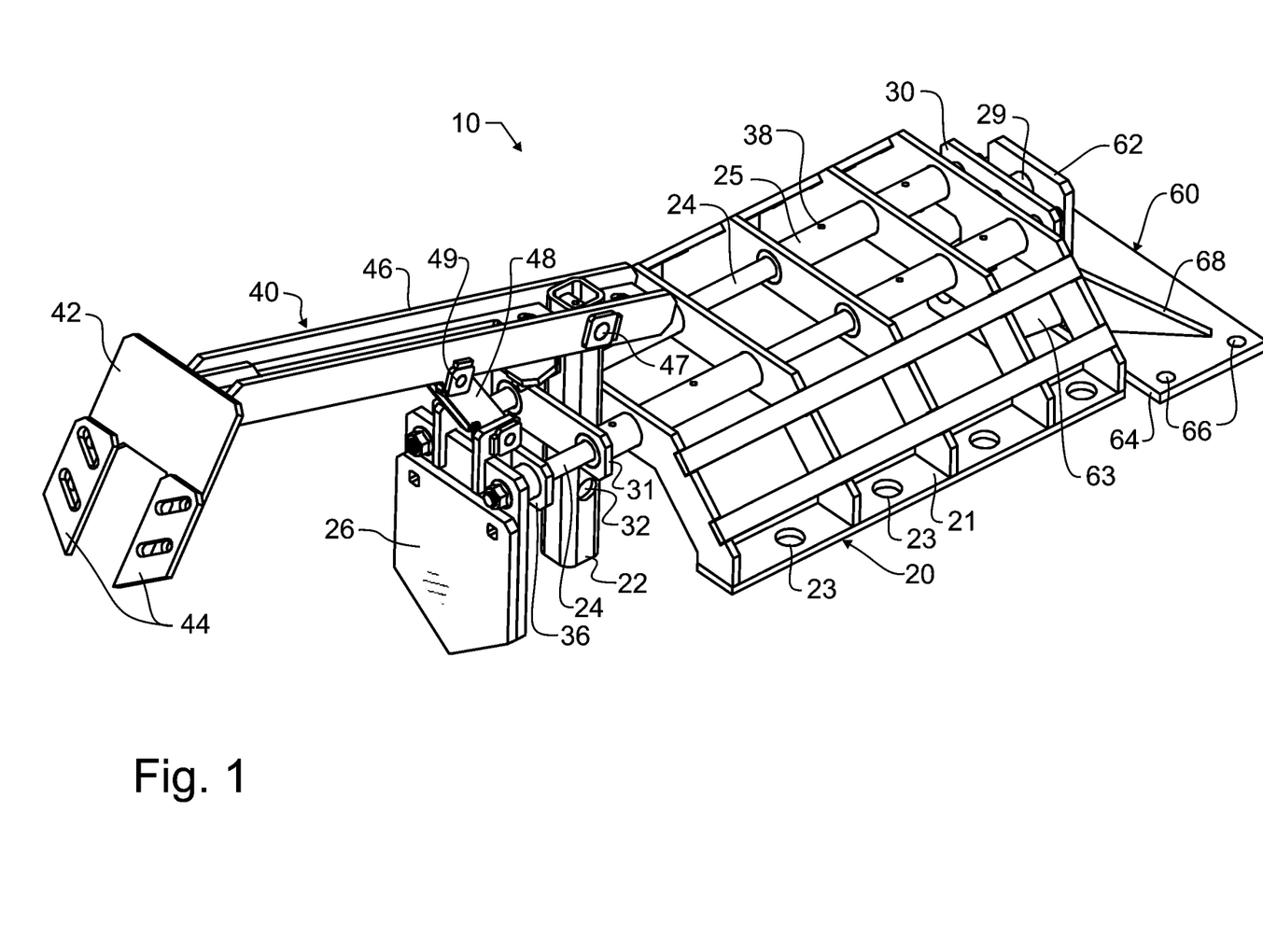
FIG. 1 illustrates a preferred embodiment pipe puller configured for attachment to a drilling and service rig pipe handler designed in accord with the teachings of the present invention and in a disengaged position from a top and front projected view.
Figure 2:
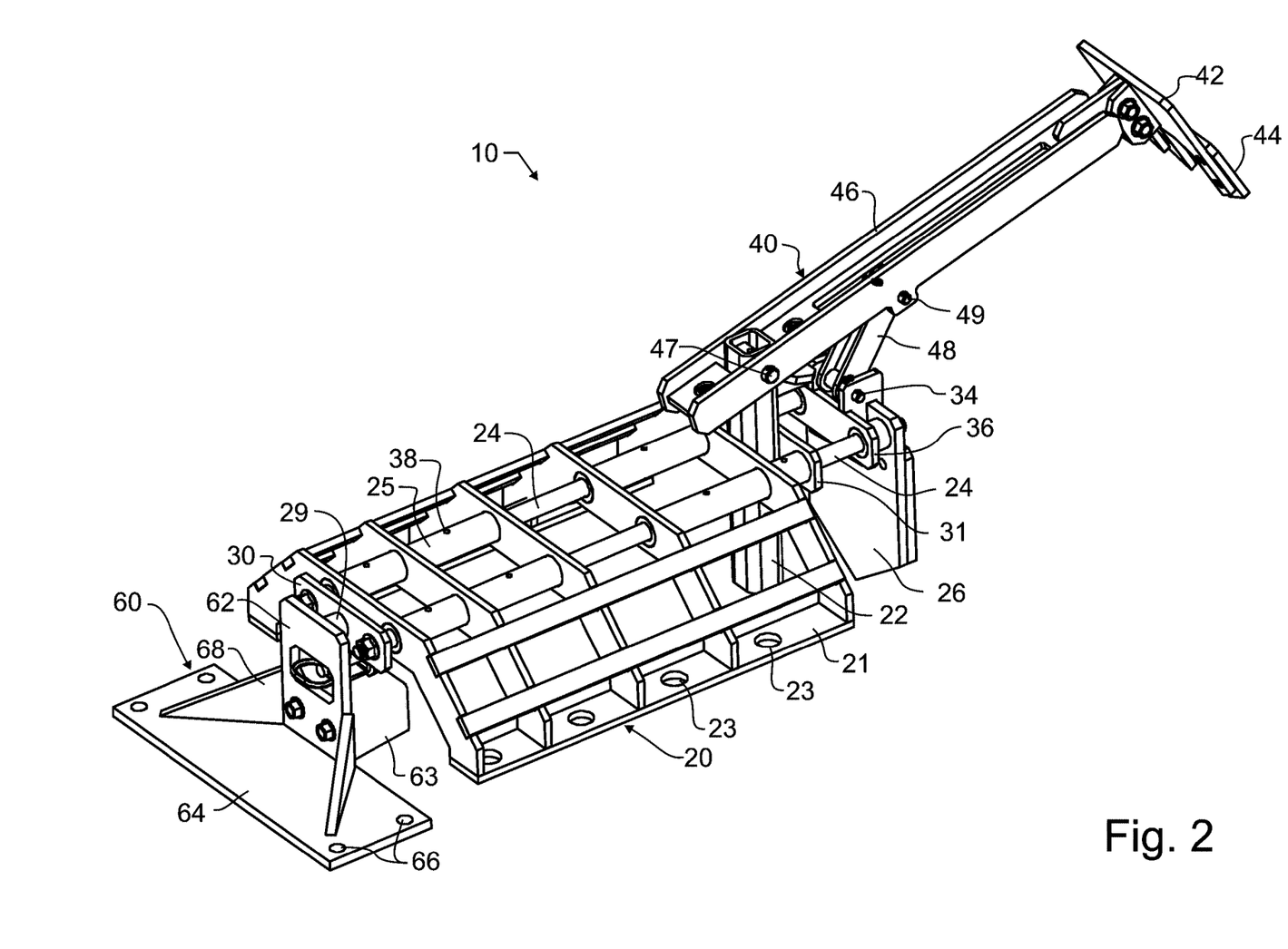
FIG. 2 illustrates the preferred embodiment pipe puller of FIG. 1 in a disengaged position, from a top and rear projected view.
Figure 3:
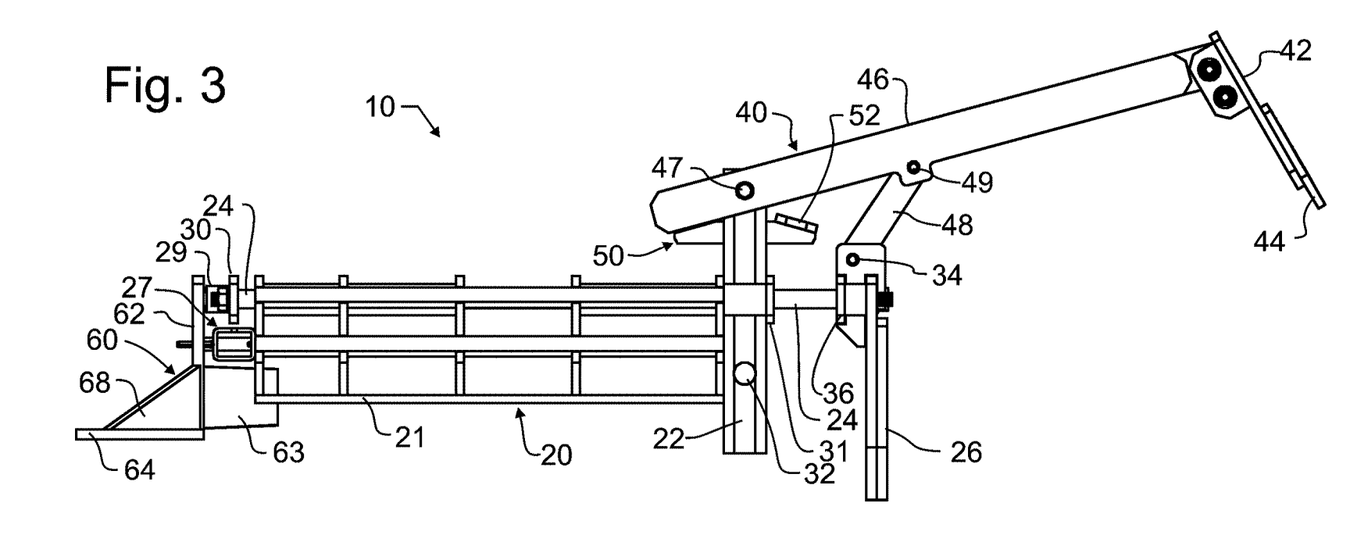
FIG. 3 illustrates the preferred embodiment pipe puller of FIG. 1 in a disengaged position, from a side elevational view.
Figure 4:
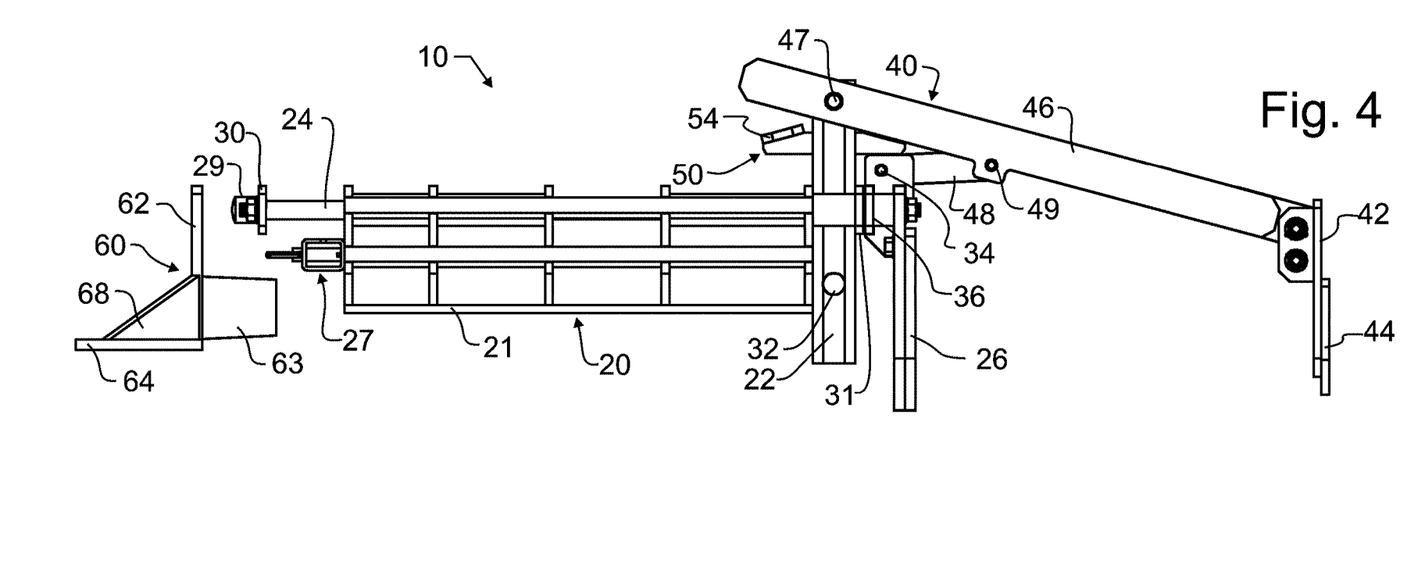
FIG. 4 illustrates the preferred embodiment pipe puller of FIG. 1 in an engaged position, from a side elevational view.

The movement of slides 24, skate plate 26, and pipe grasp 40 are best understood with reference to FIGS. 3 and 4. FIG. 3 illustrates preferred embodiment pipe puller 10 in a disengaged position, which is defined by the fact that the end of puller arm 46 adjacent to and including pipe puller grip 42 is elevated well above skate plate 26. This means that any pipe 2 that might be resting within a skidway or equivalent, such as illustrated in FIG. 8, will be untouched by pipe puller grip 42. This disengaged position is achieved during normal operation when skate 3 is lowered to the bottom end of travel. In such position, again such as illustrated in FIG. 8, pipe 2 is preferably entirely or alternatively at least substantially resting within the skidway or equivalent. Just prior to skate 3 being fully retracted, rear push rod bumper 29 will impact with vertical stop plate 62. Continuing to retract skate 3 will not lead to any further movement of slides 24, since they are stopped by rear push rod bumper 29 remaining in contact with vertical stop plate 62. Likewise, skate plate 26 and therefore pipe 2 will also remain stationary. Instead, continuing to retract skate 3 will cause framework 21 and bushings 25 to slide rearward while slides 24, skate plate 26, and pipe 2 stay fixed in position. This means that a gap will form and increase between front framework stop 31 and skate plate stop 36, such as illustrated in FIG. 3. This shift forces the lower end of puller actuator 48 to pivot about skate plate pintle 34, in a direction counterclockwise thereabout as viewed from the perspective of FIG. 3. Such counterclockwise rotation will in turn raise pipe puller grip 42 by causing puller arm 46 to rotate, again in a counterclockwise direction, about puller arm pintle 47. As may be apparent, to allow puller arm 46 to rotate, a puller actuator pintle 49 terminates puller actuator 48 distal to skate plate pintle 34.

Adjacent to the top of front support 22, and preferably just slightly below puller arm pintle 47, is a magnetic contact tree 50 having a magnetic engage assist contact pad 52 protruding in a forward direction, and a magnetic disengage assist contact pad 54 protruding in a rearward direction from front support 22. These magnetic contact pads 52, 54 may themselves be provided with powerful magnets, for exemplary and non-limiting purpose such as of the rare-earth type, or they may be large button-shaped ferritic pads that engage with such magnets where the magnets are housed within the under-belly of puller arm 46. In either case, and as is well known, the magnets and ferritic material will pull together with tremendous holding power when they are brought into contact with each other. This means that separation of the two must be intentional, creating a force-threshold activated motion that requires a force threshold greatly exceeding and separate and distinct from the static and dynamic coefficients of friction of pintles 34, 47, 49 and linear bearings 25. This means that rotation of pipe grasp 40 also must be intended, rather than being initiated by the momentary vibrations and lurches that may occur during a pipe handling operation. As a result then, and while not essential to the operation of the invention, magnetic engage assist contact pad 52 and magnetic disengage assist contact pad 54 provide improved performance and stability during operation.

Magnetic contact tree 50, including magnetic engage assist contact pad 52 and magnetic disengage assist contact pad 54, is extremely resistant to dust, dirt, contaminants, and corrosion, and so is most preferred. Nevertheless, in alternative embodiments such as described with reference to FIGS. 5-7, a latch may further be used. In yet further alternative embodiments, ball detents and other equivalent mechanisms will also be used.

Figure 8:
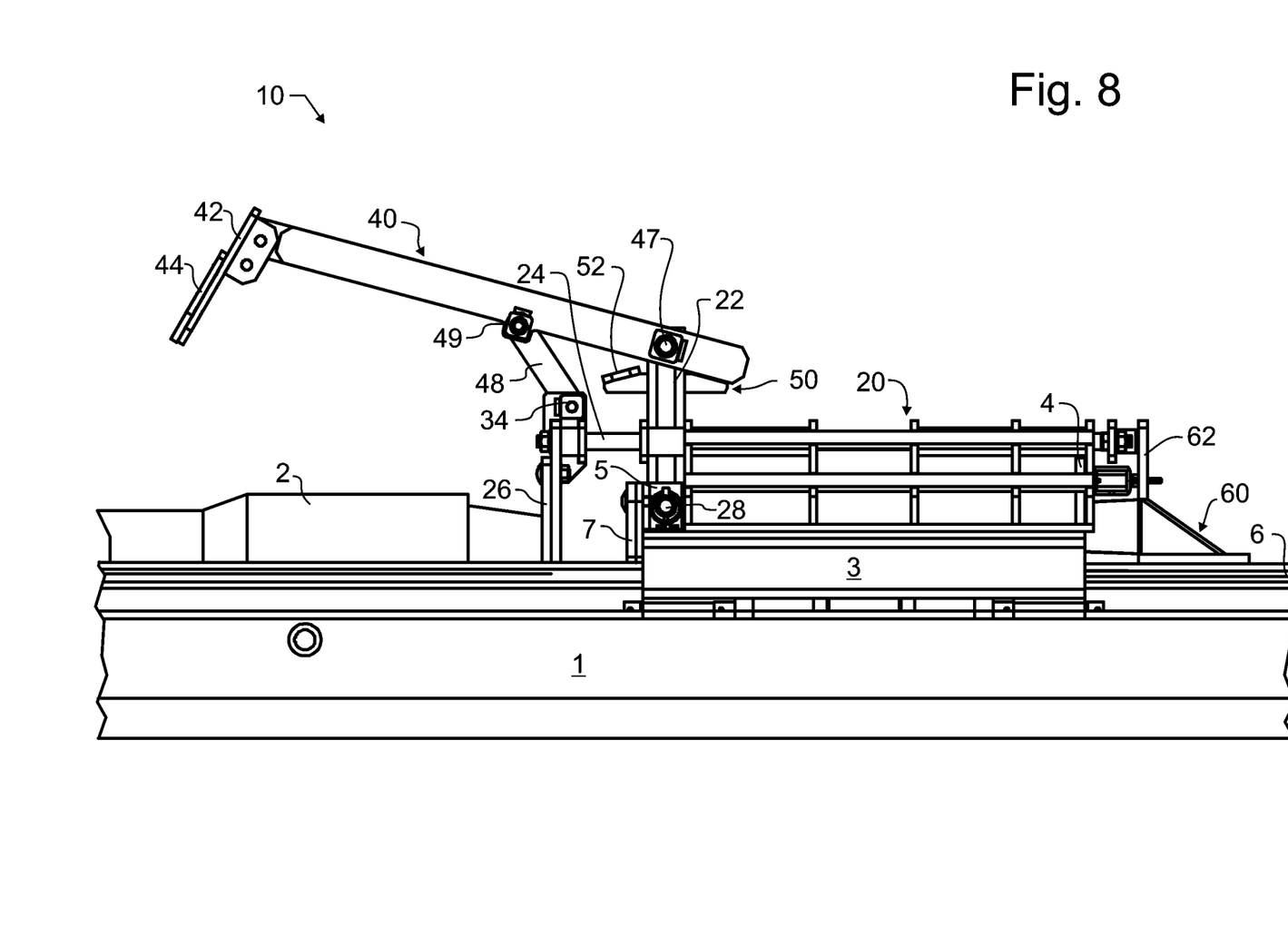
FIG. 8 illustrates the preferred embodiment pipe puller of FIG. 1 in further combination with a prior art pipe handler, in a disengaged position, from a side elevational view.

With pipe puller grip 42 raised, such as illustrated in FIGS. 3 and 8, pipe grasp 40 is disengaged from pipe 2. While in this position, pipes may be unloaded from a skidway, or loaded therein, whichever may be required for the next machine cycle. When skate 3 is then reciprocated along the skidway away from puller stop bracket 60, it is desirable to maintain puller arm 46 in the most counterclockwise rotation, such as the position illustrated in FIG. 3.

As noted, magnetic disengage assist contact pad 54 is designed, in combination with any friction between slides 24 and bushings 25, and similar friction at each pintle, to sustain puller arm 46 in this most counterclockwise rotation.

Figure 9:
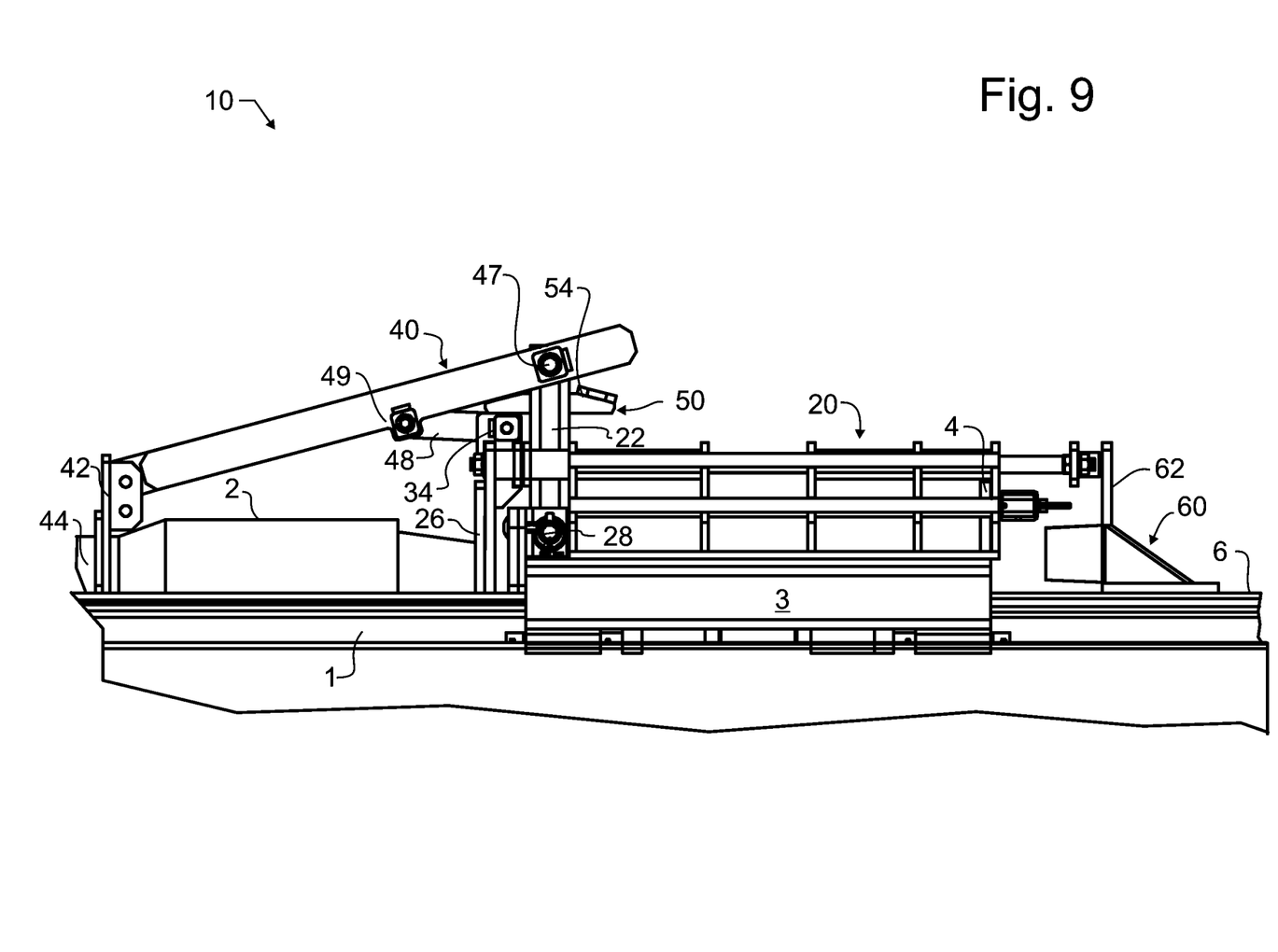
FIG. 9 illustrates the combination preferred embodiment pipe puller and prior art pipe handler of FIG. 8 in an engaged position from a side elevational view.

At some subsequent time, either through the loading of a pipe segment onto the skidway or through the advancement of skate 3 toward a pipe 2, skate plate 26 will contact pipe 2. As long as there is relative motion therebetween with more than just a nominal touch, and recalling that a pipe 2 is typically extremely heavy and so not readily moved by the substantially lower mass skate plate 26 and pipe puller 10, the result of relative movement and impact therebetween will be a release of magnetic disengage assist contact pad 54 and an essentially simultaneous shift of slides 24 within bushings 25 moving slides 24 in a rearward direction relative to bushings 25, and with sufficient relative movement ultimately bringing front framework stop 31 and skate plate stop 36 into contact with each other. This shift of slides 24 within bushings 25 will in turn rotate puller arm 46 in a clockwise direction as viewed from the perspective of FIGS. 3 and 4, finally stopping in the position of FIG. 4. In this position, such as illustrated in FIGS. 4 and 9, pipe grasp 40 has a pipe puller grip 42 that is configured to at least partially encompass pipe 2 in such a manner as to enable pipe grasp 40 to generate significant force pulling pipe 2 longitudinally down the skidway.

In preferred embodiment pipe puller 10, pipe puller grip 42 has grip adjusters 44 to accommodate different sized pipes. While illustrated for example in FIG. 5 as bolts and nuts within slotted grooves, in alternative embodiments others of the myriad of known equivalent mechanical apparatus will be used to adjust the spacing within pipe puller grip 42.

As can be clearly seen in FIG. 4, skate attachment 20 and pipe grasp 40 have completely separated from puller stop bracket 60. Puller stop bracket 60 is fixed relative to a deck 6 of pipe handler 1, such as illustrated in FIGS. 8 and 9, for exemplary and non-limiting purpose by the passage of suitable fasteners such as bolts or the like through attachment holes 66 in base plate 64 and into deck 6 or equivalent fixture within pipe handler 1.

The raising of pipe puller grip 42, such as illustrated in FIGS. 3 and 8, is brought about by impact between rear push rod bumper 29 and vertical stop plate 62 first, followed by subsequent impact between skate stop 4 and puller stop bumper 63. Since this second stop can carry significant momentum, puller stop bumper 63 is preferably a relatively large elastomeric bumper, and may be provided with holes or other geometry that allows the elastomeric material to more readily and efficiently absorb the impact energy without damaging any components. Similarly, and also for exemplary and non-limiting purpose, a pair of gussets 68 provided much needed strength and rigidity between vertical stop plate 62 and base plate 64.

Figure 5:
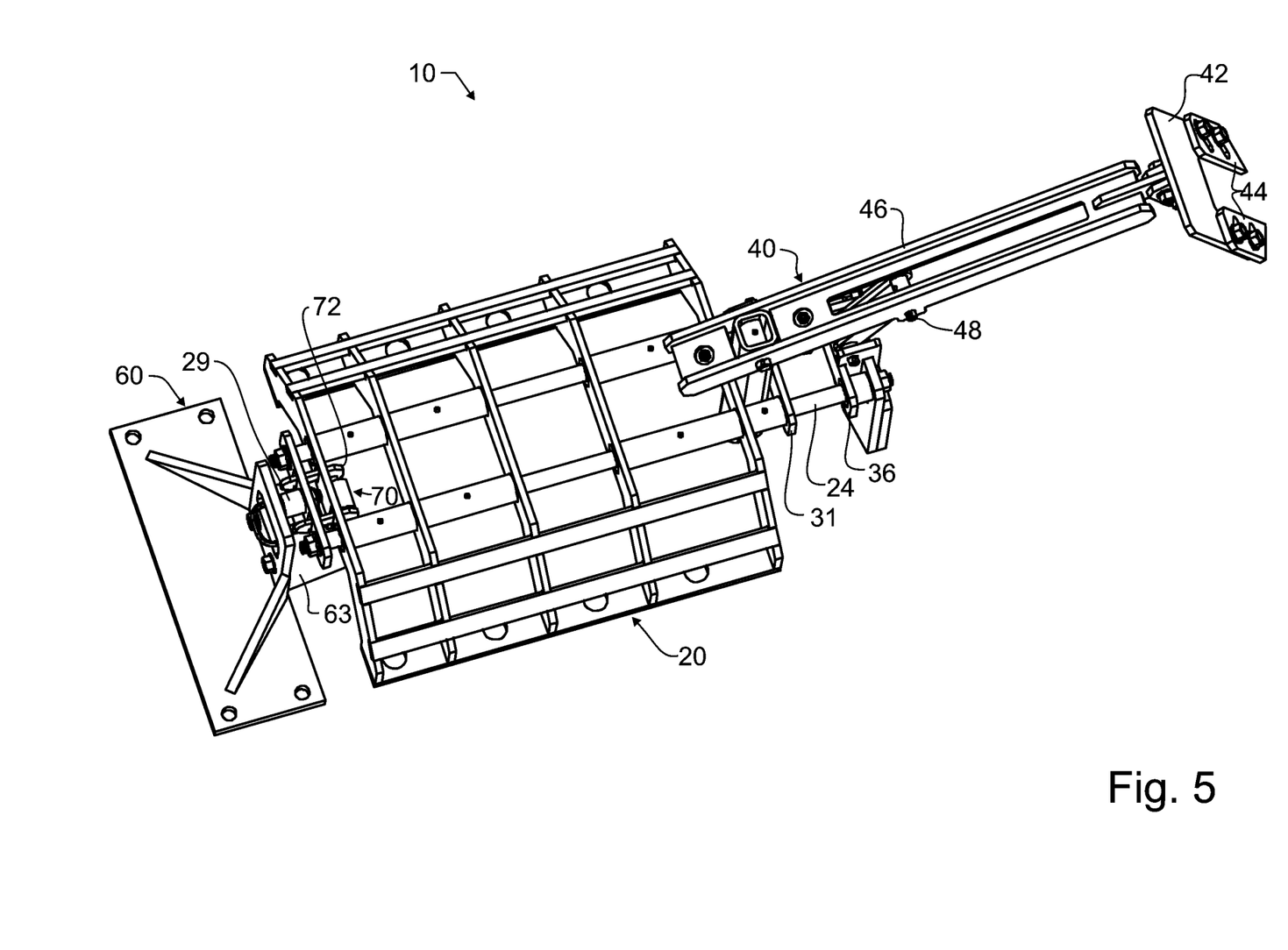
FIG. 5 illustrates a first alternative embodiment pipe puller configured for attachment to a drilling and service rig pipe handler designed in accord with the teachings of the present invention and in a disengaged position from a top and slightly rear projected view.
Figure 6:
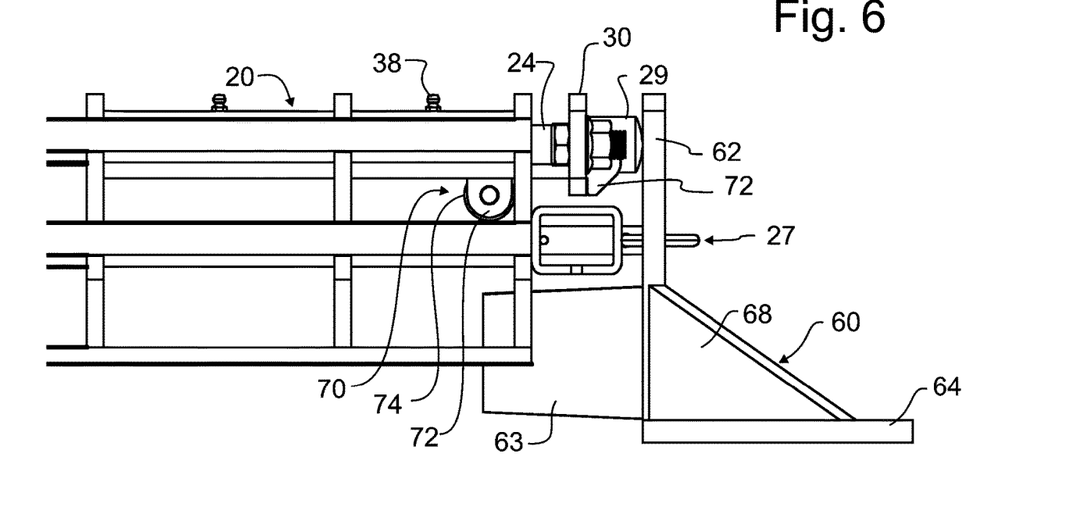
FIG. 6 illustrates the first alternative embodiment pipe puller of FIG. 5 from a side elevational view enlarged to illustrate the rear components including the puller stop bracket and latch.
Figure 7:
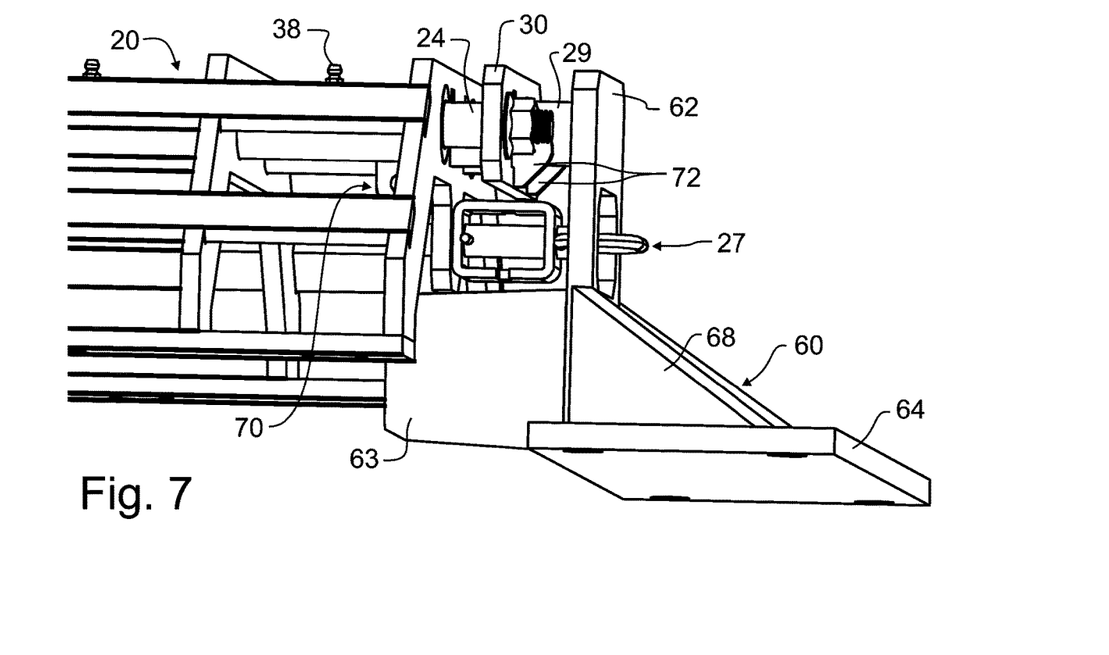
FIG. 7 illustrates the first alternative embodiment pipe puller of FIG. 6 from a bottom and rear slightly projected view.

FIGS. 5-7 illustrate a first alternative embodiment pipe puller that includes nearly all of the features of preferred embodiment pipe puller 10, and so has been like numbered. However, in addition to the other features already described herein above, a latch 70 has also been anchored to framework 21 that includes pivotal latch arms 72 and a latch spool 74. Best visible from FIGS. 6 and 7, in the disengaged position of these FIGS. 5-7, pivotal latch arms 72 pass through rear slide stop plate 30. Their ends are preferably terminated with a suitably rounded, tapered, or pointed geometry to facilitate passing through slots in rear slide stop plate 30, while in the manner of an arrowhead or grappling hook to catch with the slots and resist release therefrom without either sufficient force or intentional rotation about latch spool 74. As illustrated, latch arms 72 are configured to release with counterclockwise rotation about the central axis of latch spool 74, and so while latch 70 has only been nominally illustrated, it will be understood that there are a myriad of latches known in the mechanical and electromechanical arts that will perform the intended function, and so such alternatives are considered to be incorporated herein. For exemplary and non-limiting purpose, latch 70 may be electrically or manually actuated to release, or as with magnetic disengage assist contact pad 54 may be configured such as with a more rounded termination of pivotal latch arms 72 to pull free from the slots in rear slide stop plate 30 with a significant pull force signifying the need or desire to shift from a disengaged position to an engaged position. A significant pull force, and again similar to magnetic disengage assist contact pad 54, will preferably be greater than the ordinary and regular jostles of ordinary pipe loading and unloading within pipe handler 1.

FIGS. 6 and 7 provide sufficient enlargement to provide a better view of the grease zerks 38, which are of ordinary and known construction.

Continuing with FIGS. 8 and 9, since skate attachment 20 and pipe grasp 40 are pre-assembled as a single unit, and since only spring latch pin 27 and existing skate hood pin 28 are required for attachment to a prior art pipe handler such as pipe handler 1, these two components of preferred embodiment pipe puller 10 may be readily installed and removed at will at a job site. The third major component of preferred embodiment pipe puller 10 is puller stop bracket 60. As apparent from FIG. 4, puller stop bracket 60 is a separate assembly that is preferably securely affixed to the deck 6 of pipe handler 1 using any suitable but secure and reliable technique. In preferred embodiment pipe puller 10, bolts are passed through attachment holes 66 formed in base plate 64, and through similar holes formed in the adjacent structure of pipe handler 1. Since puller stop bracket 60 extends entirely behind the most rearward travel of skate 3, this is a portion of deck 6 of most prior art pipe handlers that is out of the way and not interfering with the operation of a pipe handler, and so is normally open and available for such installation.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a pipe handler, a pipe, and a pipe puller, said pipe handler comprising:
    a skidway having a skidway first end and a distal skidway second end and thereby defining a skidway longitudinal axis, said pipe supported within said skidway and configured to be dispensed therefrom out of said skidway second end into a drilling and servicing rig;
    a skate reciprocating longitudinally relative to said skidway and having a front skate face configured to engage and push said pipe along said skidway longitudinal axis in said skidway;
    said pipe puller comprising:
        a skate attachment having at least a framework coupled to said skate;
        at least one linear bearing supported by said skate attachment;
        at least one slide having a first end and a distal second end and thereby defining a slide longitudinal axis that is parallel to said skidway longitudinal axis, said at least one slide passing through said at least one linear bearing and configured to linearly reciprocate within said at least one linear bearing;
        a skate plate interposed between said front skate face and said pipe and rigidly affixed to said at least one slide adjacent said at least one slide first end;
        a puller stop bracket secured to said pipe handler more distally from said at least one slide first end than from said at least one slide second end, said puller stop bracket configured to limit movement of said at least one linear bearing in a direction toward said skidway first end;
        a pipe grasp pivotal about a pipe grasp pintle rotary axis that extends transverse to said longitudinal axis, said pipe grasp configured to pivot between a first pipe grasp position disengaged from said pipe and a second pipe grasp position engaged with said pipe;
        a linkage coupling said skate plate to said pipe grasp and converting reciprocal movement of said skate plate into rotary movement of said pipe grasp about said pipe grasp rotary axis;
        said skate configured to reciprocate in a first skate direction along said skidway longitudinal axis from said skidway second end toward said skidway first end sufficiently to first move said at least one linear bearing to said travel limit in said direction toward said skidway first end and subsequently continue to travel in said first skate direction to move said skate attachment relative to said at least one linear bearing and thereby pivot said pipe grasp to said first pipe grasp position disengaged from said pipe, and configured to reciprocate in a second skate direction along said skidway longitudinal axis from said skidway first end toward said skidway second end sufficiently to first move said at least one skate plate into contact with said pipe and subsequently continue to travel in said second skate direction to move said skate attachment relative to said skate plate and thereby pivot said pipe grasp to said second pipe grasp position engaged with said pipe.

2. The combination pipe handler, pipe, and pipe puller of claim 1, wherein said pipe puller further comprises an elastomeric rear slide stop configured to engage with said puller stop bracket prior to said skate reaching an end of travel when adjacent to said skidway first end.

3. The combination pipe handler, pipe, and pipe puller of claim 1, wherein said puller stop bracket further comprises a bumper protruding from said puller stop bracket and configured to engage with said skate and thereby limit movement of said skate in said first skate direction.

4. The combination pipe handler, pipe, and pipe puller of claim 1, wherein said pipe puller further comprises a pipe grasp disengage assist configured to retain said pipe grasp in said first pipe grasp position disengaged from said pipe until a force threshold about said pipe grasp pintle is greater than and separate from the static and dynamic coefficients of friction of said pipe grasp pintle, and subsequent thereto releasing said pipe grasp from said first pipe grasp position.

5. The combination pipe handler, pipe, and pipe puller of claim 1, wherein said pipe puller further comprises a pipe grasp engage assist configured to retain said pipe grasp in said second pipe grasp position engaged with said pipe until a force threshold about said pipe grasp pintle is greater than and separate from the static and dynamic coefficients of friction of said pipe grasp pintle, and subsequent thereto releasing said pipe grasp from said second pipe grasp position.

6. The combination pipe handler, pipe, and pipe puller of claim 4, wherein said pipe grasp disengage assist comprises a magnet.

7. The combination pipe handler, pipe, and pipe puller of claim 1, wherein said skate attachment consists essentially of a first pin coupling said framework to said skate adjacent to said front skate face and a second pin coupling said framework to said skate distal to said front skate face.

8. The combination pipe handler, pipe, and pipe puller of claim 5, wherein said pipe grasp engage assist comprises a magnet.

9. The combination pipe handler, pipe, and pipe puller of claim 4, wherein said pipe grasp disengage assist comprises a latch coupling said framework to said rear slide stop plate.

10. In combination, a pipe handler, a pipe, and a pipe puller,
   said pipe handler comprising:
      a skidway having a skidway first end and a distal skidway second end and thereby defining a skidway longitudinal axis, said pipe supported within said skidway and configured to be dispensed therefrom out of said skidway second end into a drilling and servicing rig;
      a skate reciprocating longitudinally relative to said skidway and having a front skate face configured to engage and push said pipe along said skidway longitudinal axis in said skidway;
   said pipe puller comprising:
      a skate attachment having at least a framework coupled to said skate;
      a pipe grasp pivotal about a pipe grasp pintle rotary axis that extends transverse to said longitudinal axis, said pipe grasp configured to pivot between a first pipe grasp position disengaged from said pipe and a second pipe grasp position engaged with said pipe;
      a pipe grasp disengage assist configured to retain said pipe grasp in said first pipe grasp position disengaged from said pipe until a force threshold about said pipe grasp pintle rotary axis is greater than and separate from the static and dynamic coefficients of friction of said pipe grasp pintle rotary axis, and subsequent thereto releasing said pipe grasp from said first pipe grasp position; and
      a pipe grasp engage assist configured to retain said pipe grasp in said second pipe grasp position engaged with said pipe until a force threshold about said pipe grasp pintle rotary axis is greater than and separate from the static and dynamic coefficients of friction of said pipe grasp pintle rotary axis, and subsequent thereto releasing said pipe grasp from said second pipe grasp position.

11. The combination pipe handler, pipe, and pipe puller of claim 10, wherein at least one of said pipe grasp engage assist and said pipe grasp disengage assist comprises a magnet.

12. The combination pipe handler, pipe, and pipe puller of claim 10, wherein said pipe puller further comprises:
   a skate plate interposed between said front skate face and said pipe;
   a puller stop bracket secured to said pipe handler more distally from said at least one slide first end than from said at least one slide second end, said puller stop bracket configured to limit movement of said skate in a direction toward said skidway first end; and
   a linkage coupling said skate plate to said pipe grasp and converting reciprocal movement of said skate plate relative to said front skate plate face into rotary movement of said pipe grasp about said pipe grasp rotary axis;
   said skate plate configured to reciprocate in a first skate plate direction along said skidway longitudinal axis from said skidway second end toward said skidway first end relative to said front skate plate face sufficiently to pivot said pipe grasp to said first pipe grasp position disengaged from said pipe, and configured to reciprocate in a second skate direction along said skidway longitudinal axis from said skidway first end toward said skidway second end relative to said front skate plate face sufficiently to pivot said pipe grasp to said second pipe grasp position engaged with said pipe.

13. The combination pipe handler, pipe, and pipe puller of claim 12, wherein said pipe puller further comprises:
   at least one linear bearing supported by said skate attachment, said at least one slide passing through said at least one linear bearing and configured to linearly reciprocate within said at least one linear bearing, said skate plate interposed between said front skate face and said pipe and rigidly affixed to said at least one slide adjacent said at least one slide first end, said puller stop bracket secured to said pipe handler more distally from said at least one slide first end than from said at least one slide second end, said puller stop bracket configured to limit movement of said at least one linear bearing in a direction toward said skidway first end;
   said skate configured to reciprocate in a first skate direction along said skidway longitudinal axis from said skidway second end toward said skidway first end sufficiently to first move said at least one linear bearing to said travel limit in said direction toward said skidway first end and subsequently continue to travel in said first skate direction to move said skate attachment relative to said at least one linear bearing and thereby pivot said pipe grasp to said first pipe grasp position disengaged from said pipe, and configured to reciprocate in a second skate direction along said skidway longitudinal axis from said skidway first end toward said skidway second end sufficiently to first move said at least one skate plate into contact with said pipe and subsequently continue to travel in said second skate direction to move said skate attachment relative to said skate plate and thereby pivot said pipe grasp to said second pipe grasp position engaged with said pipe.

14. The combination pipe handler, pipe, and pipe puller of claim 13, wherein said pipe grasp disengage assist comprises a latch coupling said framework to said rear slide stop plate.

15. The combination pipe handler, pipe, and pipe puller of claim 12, wherein said pipe puller further comprises an elastomeric rear slide stop configured to engage with said puller stop bracket prior to said skate reaching an end of travel when said adjacent to said skidway first end.

16. The combination pipe handler, pipe, and pipe puller of claim 12, wherein said puller stop bracket further comprises a bumper protruding from said puller stop bracket and configured to engage with said skate and thereby limit movement of said skate in said first skate direction.

17. The combination pipe handler, pipe, and pipe puller of claim 10, wherein said skate attachment consists essentially of a first pin coupling said pipe grasp to said skate adjacent to said front skate face and a second pin coupling said pipe grasp to said skate distal to said front skate face.

18. In combination, a pipe handler, a pipe, and a pipe puller, said pipe handler comprising:

a skidway having a skidway first end and a distal skidway second end and thereby defining a skidway longitudinal axis, said pipe supported within said skidway and configured to be dispensed therefrom out of said skidway second end into a drilling and servicing rig;

a skate reciprocating longitudinally relative to said skidway and having a front skate face configured to engage and push said pipe along said skidway longitudinal axis in said skidway;

said pipe puller comprising:

a skate attachment having at least a framework coupled to said skate;

at least one linear bearing supported by said skate attachment;

at least one slide having a first end and a distal second end and thereby defining a slide longitudinal axis that is parallel to said skidway longitudinal axis, said at least one slide passing through said at least one linear bearing and configured to linearly reciprocate within said at least one linear bearing;

a skate plate interposed between said front skate face and said pipe and rigidly affixed to said at least one slide adjacent said at least one slide first end;

a puller stop bracket secured to said pipe handler more distally from said at least one slide first end than from said at least one slide second end, said puller stop bracket configured to limit movement of said at least one linear bearing in a direction toward said skidway first end;

a bumper protruding from said puller stop bracket and configured to engage with said skate and thereby limit movement of said skate in said first skate direction;

a pipe grasp pivotal about a pipe grasp pintle rotary axis that extends transverse to said longitudinal axis, said pipe grasp configured to pivot between a first pipe grasp position disengaged from said pipe and a second pipe grasp position engaged with said pipe;

a pipe grasp disengage assist configured to retain said pipe grasp in said first pipe grasp position disengaged from said pipe until a force threshold about said pipe grasp pintle is greater than and separate from the static and dynamic coefficients of friction of said pipe grasp pintle, and subsequent thereto releasing said pipe grasp from said first pipe grasp position;

a pipe grasp engage assist configured to retain said pipe grasp in said second pipe grasp position engaged with said pipe until a force threshold about said pipe grasp pintle is greater than and separate from the static and dynamic coefficients of friction of said pipe grasp pintle, and subsequent thereto releasing said pipe grasp from said second pipe grasp position;

a linkage coupling said skate plate to said pipe grasp and converting reciprocal movement of said skate plate into rotary movement of said pipe grasp about said pipe grasp rotary axis;

an elastomeric rear slide stop configured to engage with said puller stop bracket prior to said skate reaching an end of travel when adjacent to said skidway first end;

said skate configured to reciprocate in a first skate direction along said skidway longitudinal axis from said skidway second end toward said skidway first end sufficiently to first move said at least one linear bearing to said travel limit in said direction toward said skidway first end and subsequently continue to travel in said first skate direction to move said skate attachment relative to said at least one linear bearing and thereby pivot said pipe grasp to said first pipe grasp position disengaged from said pipe, and configured to reciprocate in a second skate direction along said skidway longitudinal axis from said skidway first end toward said skidway second end sufficiently to first move said at least one skate plate into contact with said pipe and subsequently continue to travel in said second skate direction to move said skate attachment relative to said skate plate and thereby pivot said pipe grasp to said second pipe grasp position engaged with said pipe.

* * * * *